US005714936A

United States Patent [19]

Regelsberger

[11] Patent Number: 5,714,936

[45] Date of Patent: Feb. 3, 1998

[54] APPARATUS AND METHOD FOR PROTECTING A MAGNETIC LAYER ON PHOTOSENSITIVE MATERIAL

[75] Inventor: Matthias H. Regelsberger, Rochester, N.Y.

[73] Assignee: Eastman Kodak Company, Rochester, N.Y.

[21] Appl. No.: 591,357

[22] Filed: Jan. 25, 1996

[51] Int. Cl.[6] ...................... G08B 13/187; B65D 55/676; B65H 75/18; G11B 23/107

[52] U.S. Cl. ......................... 340/572; 206/409; 242/348; 242/601; 242/610; 340/551

[58] Field of Search .................................. 340/572, 551; 206/409; 242/348, 601, 610

[56] References Cited

U.S. PATENT DOCUMENTS

| | | | |
|---|---|---|---|
| 4,510,490 | 4/1985 | Anderson, III et al. | 340/572 |
| 4,568,921 | 2/1986 | Pokalsky | 340/572 |
| 4,632,250 | 12/1986 | Ueda et al. | 206/524.2 |
| 4,665,387 | 5/1987 | Cooper et al. | 340/572 |
| 4,692,746 | 9/1987 | Budin et al. | 340/572 |
| 4,811,000 | 3/1989 | Humphrey et al. | 340/551 |
| 4,910,625 | 3/1990 | Albrecht et al. | 360/135 |
| 4,948,063 | 8/1990 | Niedospial, Jr. | 242/348.3 |
| 4,967,184 | 10/1990 | Regelsberger | 340/572 |
| 5,046,679 | 9/1991 | Wolf et al. | 242/348.3 |
| 5,046,680 | 9/1991 | Niedospial et al. | 242/348.3 |
| 5,436,120 | 7/1995 | Wexler et al. | 430/496 |

FOREIGN PATENT DOCUMENTS 4242992 6/1994 Germany .

OTHER PUBLICATIONS

Source Tagging Summary Chart, 2 pages.

"Physics of Magnetism", pp. 281–285. Authors: S. Chikzumi and S.H. Charap.

*Primary Examiner*—Glen Swann

*Attorney, Agent, or Firm*—Susan L. Parulski

[57] ABSTRACT

A cartridge for protecting a magnetic layer on a photosensitive web material from a magnetic field. The cartridge comprises a ferromagnetic material dispersed in a polymer, the composite material of the polymer and the ferromagnetic material having a magnetic permeability greater than 1.0. The magnetic layer is shielded from a magnetic field applied externally of the cartridge, such as from an article surveillance system, which could affect recorded information on the magnetic layer.

29 Claims, 2 Drawing Sheets

APPARATUS AND METHOD FOR PROTECTING A MAGNETIC LAYER ON PHOTOSENSITIVE MATERIAL

FIELD OF THE INVENTION

The invention relates to electronic article surveillance systems. More particularly, the invention relates to an apparatus and method for shielding a magnetic layer on a photosensitive material from magnetic fields, such as those associated with the use of electronic article surveillance systems.

BACKGROUND OF THE INVENTION

Electronic article surveillance (EAS) systems used to protect an article from unauthorized removal from a defined area (e.g., a department store) are well known. One such electronic article surveillance system works on the principle of detecting the presence of a particular form of ferromagnetic material in a periodically changing low level magnetic field. As illustrated in FIG. 1, the article 100 to be protected against unauthorized removal has an electronic article surveillance marker 110 attached to it. The marker includes a strip of low coercivity ferromagnetic material of high permeability. The marker is activated by subjecting it to an activation magnetic field. When the article, with the activated marker attached, is brought into an interrogation zone 120 in which the low level periodically changing magnetic field is applied by means of a radiating antenna 130 located at the edge of the zone, the presence of the strip modifies the pattern of the applied field generating the magnetic subfields at harmonics of the fundamental frequency of the applied field. These harmonic fields are picked up by a receiving antenna 140, located at the edge of the interrogation zone, and fed to a receiver where they are detected and used to trigger an alarm to signal the unauthorized removal of the article.

For the article to be removed from the defined area without triggering the alarm, the marker may be physically removed from the article. Alternatively, the marker may be deactivated by demagnetizing the marker, that is, by subjecting the marker to a deactivation magnetic field at a checkout or authorizing station.

A problem arises when the markers are used to protect the unauthorized removal of magnetically sensitive material, such as recorded magnetic tapes (e.g., video tape). Care must be taken to make certain that the activation and deactivation magnetic fields do not extend to the magnetic media and damage the recording on the magnetic layer. Accordingly, recorded magnetic media are specially handled in a retail environment, such as at a department store.

Photosensitive material, such as photographic film, may include a magnetic layer, for example as disclosed in U.S. Pat. No. 5,436,120, commonly assigned, and incorporated herewith. Information may be recorded on the magnetic layer during manufacturing, for example manufacturing information or processing information. Subsequent entries can be made during exposure, processing, printing, and retrieval. Since consumer photographic film, because of its compact size, is quite vulnerable to theft, electronic article surveillance markers are commonly applied to the surface of the cartons or packaging in which the film is contained. Such markers can be applied by the manufacturer at the manufacturing site, or by a retailer prior to shelving the article for sale. Since film is not typically known to comprise a magnetic layer, it may not receive the special handling required for recorded magnetic media. Therefore, there exists a need to protect the magnetic layer from an activation and deactivation magnetic field. By protecting the magnetic layer, the handling of the film can be transparent to a consumer and the retailer, and special handling would not be required.

U.S. Pat. No. 4,665,387 relates to an apparatus for deactivating and reactivating markers on magnetic tape cassettes. In order to protect the magnetic media from an activation and deactivation magnetic field, a particular apparatus specific to the article is required to activate and deactivate the marker without affecting the magnetic media. The apparatus, configured to accept a tape cassette, includes magnets arranged such that the magnetic field is very strong in the region of the marker but does not extend into the cassette with sufficient strength to affect the magnetic tape of the cassette.

U.S. Pat. No. 4,632,250 discloses a magnetic shielding device for protecting a planar magnetic recording against external magnetic fields. The article to be protected is positioned within the device. The device includes a main body and a lid having a plurality of spaced apart sheets of ferromagnetic material. As such, an additional apparatus, separate from the article to be protected, is required to shield the magnetic recording.

Accordingly, a need exists for a method and apparatus for protecting a magnetic layer on film by shielding it from an externally applied magnetic field. It is highly desirable that the method and apparatus not require special handling. It is further desirable that the apparatus include integral means, as part of the apparatus, for protecting the magnetic layer from an externally applied magnetic field.

SUMMARY OF THE INVENTION

An object of the invention is to provide a method and apparatus for protecting a magnetic layer on film by shielding it from an externally applied magnetic field, without requiting special handling.

Another object of an embodiment of the invention is to provide a film cartridge which includes integral means, as part of its structure, for protecting a magnetic layer on the film by shielding it from an externally applied magnetic field.

Yet another object of an embodiment of the invention is to provide a package for a film cartridge including an electronic article surveillance marker wherein the marker can be activated and deactivated without the use of a special apparatus and without detrimental effect to a magnetic layer on the film.

Still another object of an embodiment of the invention is to provide a cartridge for film comprising a magnetic layer, such that the film will not require special handling.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a cartridge for a photosensitive web material having a magnetic layer, the magnetic layer having a predetermined coercivity. The cartridge comprises a ferromagnetic material dispersed in a polymer. The composite material of the polymer and ferromagnetic material having a magnetic permeability greater than 1.0, allowing the magnetic layer of the photosensitive web to be shielded from a magnetic field applied externally of the cartridge which could affect the magnetic layer of the photosensitive web.

According to another aspect of the invention, there is provided a package comprising a film cartridge enclosing a web of photosensitive material having a magnetic layer with a pre-determined coercivity. The package further comprises a marker positioned external to the film cartridge, the marker being activatable by an activation magnetic field and deactivatable by a deactivation magnetic field, the magnetic fields applied externally of the film cartridge. The film cartridge comprises a dispersion of a polymer and a ferromagnetic material. The composite material of the polymer and ferromagnetic material has a magnetic permeability greater than 1.0, such that the film cartridge shields the magnetic layer from the magnetic fields.

According to another aspect of the invention, there is provided an article of manufacture configured for cooperation with a camera. The article includes a strip of photosensitive web material having a magnetic layer with a predetermined coercivity from about 250 to about 1150 oersted, and a spool onto which the strip of photosensitive web is wound, the spool comprising of a non-ferromagnetic material. The article further comprises a shell including a ferromagnetic material dispersed in a polymer, the composite material of the shell having a magnetic permeability greater than 1.0, with the shell having two opposing ends. End caps comprised of a non-ferromagnetic material are attached to each of the ends of the shell. The shell, spool, and end caps defining a light-tight film cartridge for cooperation with a camera. The magnetic layer of the photosensitive web within the light-tight film cartridge is protected from a magnetic field applied externally of the cartridge affecting the magnetic layer of the photosensitive web.

According to a further aspect, a method is provided for protecting a web of photosensitive material having a magnetic layer with a pre-determined coercivity. The method includes the step of providing a film cartridge comprising a material having a magnetic permeability greater than 1.0, a web of photosensitive material enclosed within the film cartridge having a pre-determined coercivity from about 250 to about 1150 oersted, and a marker applied externally to the film cartridge. The marker is activatable by an activation magnetic field and deactivatable by a deactivation magnetic field. The method further comprises the steps of activating the marker such that the marker is detectable by an interrogation article surveillance magnetic field external of the film cartridge, and deactivating the marker such that the marker is not detectable by the interrogation electronic article surveillance magnetic field. The method includes shielding the magnetic layer of the photosensitive web from the activation and deactivation magnetic fields, whereby the magnetic layer is protected. In a preferred embodiment, the film cartridge is thermoformed (i.e., molded) using ferromagnetic material dispersed in a polymer. The composite material of the polymer and ferromagnetic material have a magnetic permeability greater than 1.0.

Such a film cartridge includes integral means, as part of its structure, which protects the magnetic layer of the film by shielding it from an externally applied magnetic field. As such, no additional shielding apparatus is required. Further, a marker applied to such a cartridge can be activated and deactivated without the use of a special apparatus, whereby no special activation and deactivation apparatus is required, and no special handling is required.

BRIEF DESCRIPTION OF THE DRAWING

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
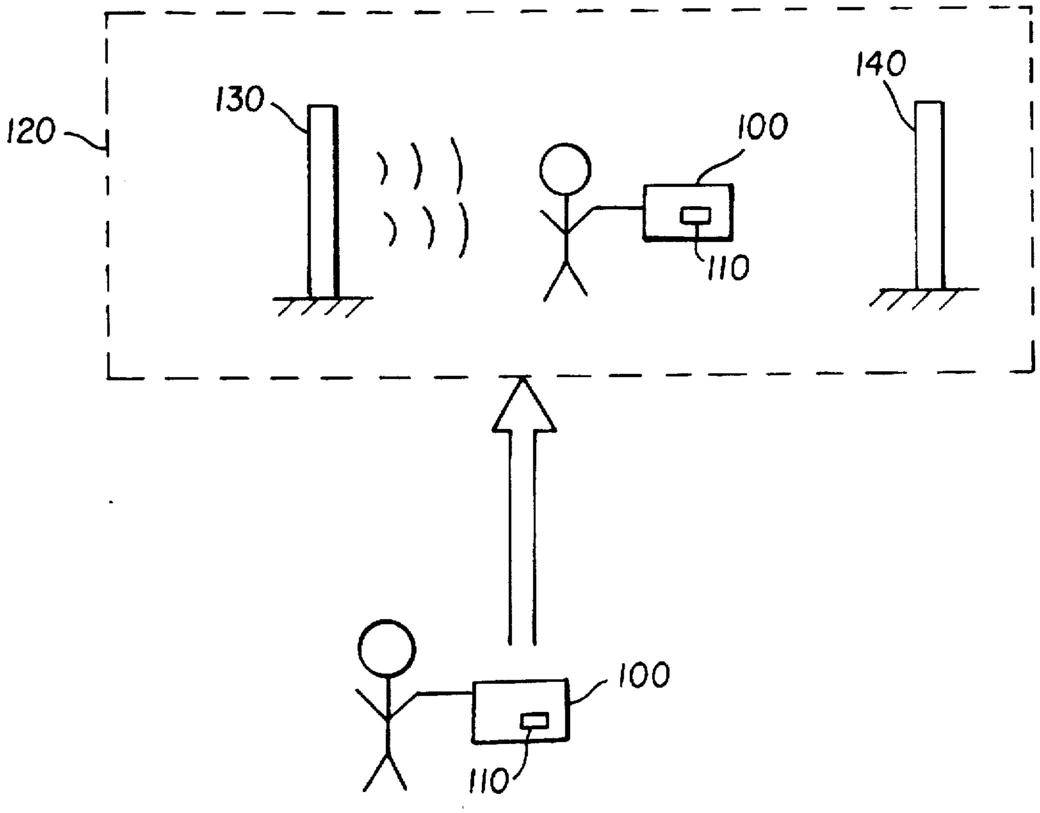
FIG. 1 shows an interrogation zone of an article surveillance system.

The following is a detailed description of the preferred embodiments of the invention, reference being made to the drawings in which the same reference numerals identify the same elements of structure in each of the several figures.

Figure 2:
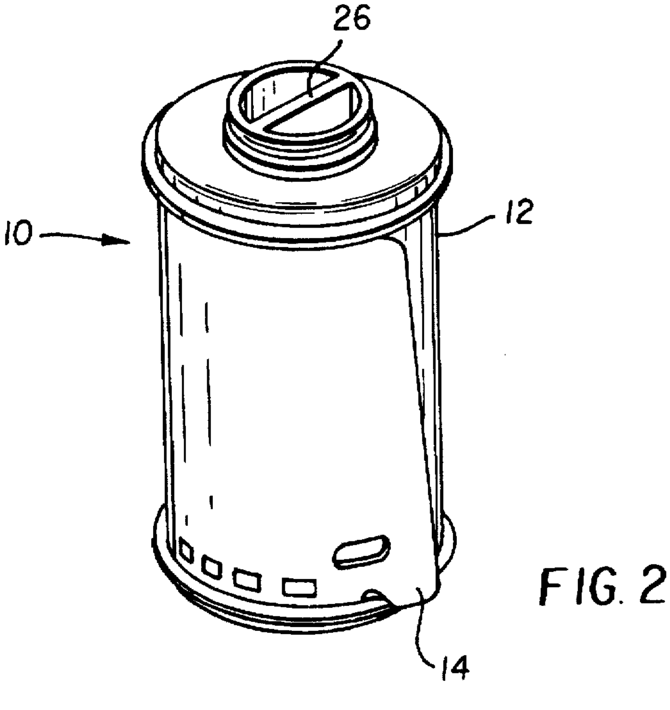
FIG. 2 shows a film cartridge according to the present invention.
Figure 3:
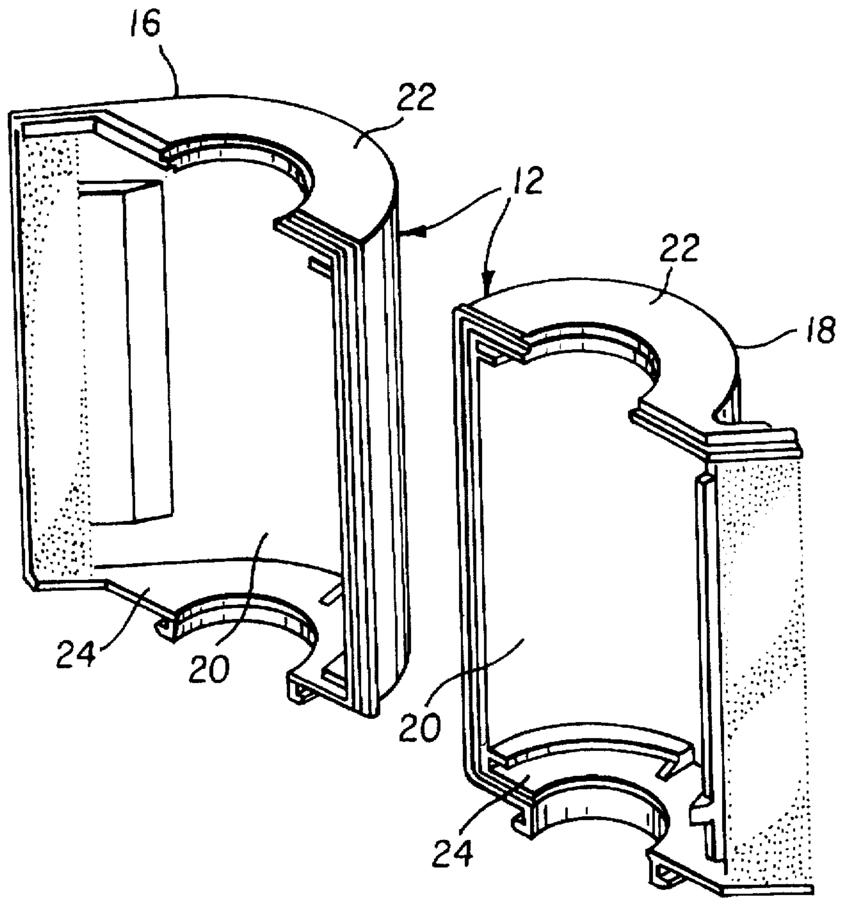
FIG. 3 shows two shells halves comprising the film cartridge according to the present invention.

FIGS. 2 and 3 illustrate a film container or film cartridge 10, such as a 35 mm cartridge, comprising a shell 12 and a web 14 of photosensitive material. Such a 35 mm cartridge is disclosed in U.S. Pat. No. 4,948,063, U.S. Pat. No. 5,046,679, and U.S. Pat. No. 5,046,680, each of which is assigned to the same assignee and herein incorporated by reference. Film cartridge 10 is configured to cooperate with a camera. Preferably, shell 12 consists of two shell halves 16,18. As illustrated, each shell half 16,18 includes a cylindrical portion 20 having two ends, and an end cap 22,24 at each end. Alternatively end caps 22,24 may be separate from cylindrical portion 20. A spool 26 holds web 14. As will become apparent from the following description, web 14 is preferably located entirely inside cartridge 10.

Web 14 includes a magnetic layer, on which information can be recorded. Such a web material is disclosed in U.S. Pat. No. 5,436,120, assigned to the same assignee and herein incorporated by reference. The magnetic layer is capable of repeated use in both the recording and reading mode. Prior to sale of the product, for example during manufacturing, entries may be made to the magnetic layer. Such entries can include information regarding manufacturing or processing. Subsequent entries may be made during exposure, processing, printing, and retrieval. Generally, the coercivity of the magnetic layer (hereinafter referred to as $H_{Cfilm}$) is from about 250 oersted (Oe) to about 1150 oersted, preferably in the range of about 750 to 950 oersted.

A film cartridge is commonly comprised of a metal material, such as a cold rolled steel. However, the configuration of the film cartridge is changing. The film cartridge is becoming more complex and requiring tight manufacturing tolerances, and may not be manufacturable using steel. Further, recyclability and cost of the film cartridge are of consideration. Polymers, such as recyclable polymers, are a possible material selection, however, polymers do not have the necessary material properties for protecting a magnetic media from a magnetic field. That is, a film cartridge consisting of a polymer would not provide shielding for a magnetic layer on a photosensitive web of material. Therefore, in accordance with the present invention, shell 12 comprises ferromagnetic material dispersed in a polymer; the resulting composite material (formed by the polymer and the ferromagnetic material) having a magnetic permeability $\mu$ greater than 1.0.

The ferromagnetic material has a characteristic such that minimal or no magnetism remains therein even when the material is repeatedly exposed to a magnetic field. It is advantageous to use ferromagnetic material which is magnetically soft and of inherently relatively high magnetic permeability (e.g., in the order of 100–1,000). Examples include iron, silicon steel, and various iron and steel alloys. Such ferromagnetic materials can be commonly prepared into small particulates for molding with a polymer. The composite material (which may be prepared with or without fillers) has a magnetic permeability from greater than 1 to about 50.

As is well known to those skilled in the art, shell 12 can be formed by a variety of methods. In a preferred embodiment, the shell is formed by means of thermoforming, for example by an injection molding process. Examples of suitable polymers include polypropylene, high impact polystyrene, polyurethane, and nylon 6/6, polyolefin, polycarbonate, and polyphenylene ether. The composite material may further comprise filler material, such as glass filler, to provide suitable mechanical properties for the cartridge. The dispersion includes sufficient ferromagnetic material for the composite material comprising cartridge 10 to have a magnetic permeability greater than 1.0. Generally, the composite material would be approximately 25–45 percent ferromagnetic material (weight percent relative to the total weight of the composite). A dispersion of polymer and ferromagnetic material is typically non-covalently bonded.

Magnetic shielding against external magnetic fields is provided by ferromagnetic materials by attenuating the externally applied magnetic field. The shielding effect is a function of the magnetic properties of the composite material forming the film cartridge. Accordingly, as will be understood from the following discussion, a maximum mount of ferromagnetic material dispersed in the polymer is preferred to maximize the attenuation of the externally applied magnetic field. However, those skilled in the art will recognize that there are practical considerations regarding the amount of ferromagnetic material which can be dispersed in the polymer, for example the bonding between the polymer and ferromagnetic material.

Examples of Electronic Article Surveillance (EAS) systems using activatable and deactivatable markers are disclosed in U.S. Pat. No. 4,510,490 and U.S. Pat. No. 4,568,921. With such electronic article surveillance systems three magnetic fields are used: an activation magnetic field to activate the article surveillance marker, a deactivation magnetic field to deactivate the marker, and an interrogation magnetic field to interrogate a zone for the presence of the marker. The electronic article surveillance marker (such as those available from vendors Knogo, Sensormatic, and 3M) includes a first ferromagnetic material $F_1$ utilized by the interrogation magnetic field to detect the presence of the marker, and a second ferromagnetic material $F_2$ utilized by the activation and deactivation magnetic fields to enable and disable the response of the material $F_1$ to the interrogation field; each material $F_1$ and $F_2$ having a corresponding coercivity, $H_{CF1}$ and $H_{CF2}$, respectively, $H_{CF1}$ being smaller than $H_{CF2}$. The interrogation field is larger than $H_{CF1}$ in amplitude, but always smaller than $H_{CF2}$. The marker is deactivated by magnetizing material $F_2$ in a preferred direction by exposing it to a DC magnetic field, which is essentially larger in magnitude than the coercivity $H_{CF2}$ of material $F_2$. Similarly, the marker is activated by exposing material $F_2$ to an AC magnetic field essentially larger in magnitude than the coercivity $H_{CF2}$ of material $F_2$. Thus, the switching magnetic field $H_{switch}$, either the AC or DC magnetic field, is greater than the coercivity of material $F_2$.

To ensure reliable activation and deactivation of the electronic article surveillance marker, a high switching magnetic field $H_{switch}$ is preferred. The generation of such AC and DC magnetic fields may be subject to government regulations and guidelines. However, the trend is to increase the strength of these magnetic fields. It will be recognized that the required strength of $H_{switch}$ magnetic field is dependent on the proximity of the marker to the magnetic field. For example, in the interest of high throughput during checkout by retailers, a shopping bag filled with items will be passed through a switching magnetic field to deactivate, in one pass, the markers located on each item in the shopping bag. Such a magnetic field will need to be sufficiently strong to ensure that each marker in the filled shopping bag is reliably deactivated. In contrast, a weaker magnetic field is required if a single item is positioned within close proximity to the switching magnetic field.

For DC magnetic fields, such as to deactivate an EAS marker, the attenuation $\delta_{DC}$ of such DC magnetic fields penetrating film cartridge 10 is to first order inversely proportional to the magnetic permeability $\mu$ of the composite material comprising film cartridge 10. (As is known to those skilled in the art, details in the dimensions and geometry of the film cartridge may modify the proportionality significantly, typically by decreasing the magnetic shielding.) As such:

$$\delta_{DC} \approx 1/\mu \qquad \text{(Equation 1)}$$

For AC magnetic fields, such as to activate an EAS marker, the attenuation $\delta_{AC}$ of AC magnetic fields is effective if the fill cartridge is composed of electrically conductive material. The AC magnetic field induces electrical currents in the conductive material, which in turn, generates AC magnetic fields opposing and therefore attenuating the externally applied AC magnetic field. The attenuation $\delta_{AC}$ depends on the frequency and strength of the externally applied AC magnetic field and the conductivity of the conductive material.

The effective magnetic field attenuation $\delta$ is dependent on the material parameters of electrical conductivity and magnetic permeability, and calculated by summing the AC and DC attenuation components. That is:

$$\delta = \delta_{AC} + \delta_{DC} \qquad \text{(Equation 2)}$$

Accordingly, the above-identified material selection for film cartridge 10 provides shielding of web 14's magnetic layer from the activation and deactivation magnetic fields.

In currently available electronic article surveillance systems, the AC magnetic field used to activate the marker is typically less than or about 1000 oersted in peak amplitude and generated using the frequency of the AC power line, typically 50 to 60 cycles/second. Since most composite materials are not conductive, the value of $\delta_{AC}$ is generally small. Therefore, generally, the effective magnetic field attenuation $\delta$ is approximately equal to $\delta_{DC}$. According to Equation 2, the distribution of the ferromagnetic material and the electrically conductive material affects the efficiency of the shielding effect. As such, it is recognized that details in the shape and form of film cartridge 10 affects the shielding effect.

The protection of the magnetic layer of web 14 is accomplished by ensuring that for all switching magnetic fields $H_{switch}$, the following conditions are met:

$$H_{switch} \leqq H_{Cfilm} * \frac{1}{\delta} \qquad \text{(Equation 3)}$$

Substituting in Equations 1 and 2, and assuming that $\delta_{AC}$ is much smaller relative to $\delta_{DC}$, it follows that:

$$H_{switch} \leqq H_{Cfilm} * \mu \quad \text{(Equation 4)}$$

wherein $H_{Cfilm}$ is the coercivity of the magnetic layer of web 14, and μ is the magnetic permeability of the composite material (forming film cartridge 10). Therefore, the switching magnetic field $H_{switch}$ should be less than or equal to the product of the coercivity of the web's magnetic layer ($H_{Cfilm}$) and the magnetic permeability of the composite material (μ).

For example, for web 14 having a coercivity of 150 Oe, and a magnetic permeability μ of 10, a switching magnetic field $H_{switch}$ of up to 1500 Oe can be applied without affecting the magnetic characteristics of web 14 within film cartridge 10.

It is recognized that the above example is a numerical illustration of the principle of the equation. However, those skilled in the art recognize that magnetic materials microscopically exhibit a distribution of coercivities around their macroscopically measured mean values. That is, the magnetic layer may have a range of coercivity values, so a single coercivity value associated with the magnetic layer would be an average of the range of values. Thus, $H_{Cfilm}$ commonly refers to an average of the coercivity values for the magnetic layer of web 14. Therefore, in order to protect the magnetic layer of the web, the smallest coercivity (of the distribution) should be used to determine the maximum magnetic field which could be applied safely. This estimate is valid for all magnetic fields, electronic article surveillance system magnetic fields and other non-electronic article surveillance system magnetic fields such as permanent magnets. Accordingly, Equation 4 would be:

$$\text{Maximum } (H_{switch}) \leqq \text{Minimum } (H_{Cfilm}) * \mu \quad \text{(Equation 5)}$$

Written alternatively:

$$\text{Maximum } (H_{switch}) / \text{Minimum } (H_{Cfilm}) \leqq \mu \quad \text{(Equation 6)}$$

The product of the magnetic permeability of the composite material of the film cartridge and the minimum coercivity of the magnetic layer should be greater than or equal to the maximum switching magnetic field (i.e., the activation or deactivation magnetic fields) (Equation 5). Stated alternative in Equation 6, the ratio of the maximum switching magnetic field to the minimum coercivity of the magnetic layer should be less than or equal to the magnetic permeability of the composite material. For ease of discussion, this ratio of the switching magnetic field to the coercivity of the magnetic layer will be referred to as the field ratio. To ensure reliable protection of the magnetic layer, it is preferable that the field ratio does not exceed one-third of the magnetic permeability of the composite material (accounting for the above-stated distribution). Specifically:

$$H_{switch}/H_{Cfilm} \leqq (1/3) * \mu \quad \text{(Equation 7)}$$

This one-third role is a general rule-of-thumb for practical applications. By using this general role-of-thumb, Equation 7 approximates Equation 6. The above equation applies for both AC and DC magnetic fields $H_{switch}$. For AC magnetic fields, the peak value of the applied AC magnetic field can be used.

As is apparent from the above discussion, protection of the magnetic layer from a magnetic field is provided when web 14 is contained within shell 12, recognizing that concerted malicious attempts to adversely affect the recorded information may be outside the scope of this invention. Such protection can occur at any stage of the life of web 14 within cartridge 10: from manufacturing, through printing, to storage and archival.

Figure 4:
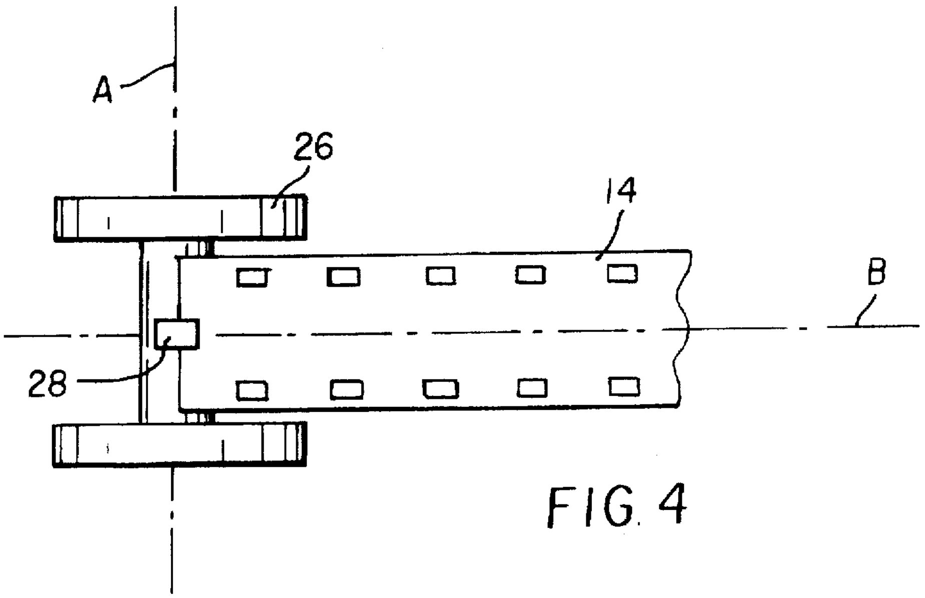
FIG. 4 shows a side view of a spool with a strip of web material attached to the spool.

Referring again to FIG. 2, spool 26 extends through end caps 22,24 of shell halves 16,18. If spool 26 is not comprised of a ferromagnetic material, then spool 26 can form a "hole" in the magnetic shield. As such, the shell halves 16,18 (including cylindrical portion 20 and end caps 22,24) would form a magnetic shielding portion, but spool 26 would not prevent passage of an external magnetic field. Similarly, if end caps 22,24 and spool 26 were not comprised of a ferromagnetic material, then end caps 22,24 and spool 26 would form a "hole" in the magnetic shield. As such, cylindrical portion 20 would form a shielding portion, but end caps 22,24 and spool 26 would not prevent passage of an external magnetic field. However, due to the orientation of the magnetic particles on web 14 (described below), web 14 may not be adversely affected from an external magnetic field as a result of these "holes". That is, neither spool 26 nor end caps 22,24 need to comprise a material having a permeability greater than 1.0. Rather, both spool 26 and end caps 22,24 can consist of a polymer or other non-ferromagnetic material, or comprise a composite of such materials. Even with these "holes" formed by spool 26 and end caps 22,24, the magnetic layer of web 14 will be protected from an externally applied magnetic field. Referring to FIG. 4 which shows web 14 attached to spool 26 by a strip of adhesive tape 28, the magnetic particles of the magnetic layer are oriented in a direction orthogonal to an axis A of spool 26, or stated alternatively, are oriented parallel to an axis B of web 14. This orientation is accomplished during the coating process, in the direction of coating. This orientation is desirable for recording of information and increases the signal strength during readback. At the same time, recording information on the magnetic layer in a direction perpendicular to the oriented particles becomes difficult, resulting in a decrease of the readback signal. This phenomenon is well known (as disclosed in *Physics of Magnetism*, S. Chikazumi and S. H. Charap, pages 281–285, John Wiley & Sons, Krieger Publishing Co., 1978) and has resulted in the study of decreasing the amount of orientation for disk-shaped media. By the same reasoning that recording perpendicular to the preferred orientation of the magnetic particles is more difficult, magnetic fields applied along axis A to film cartridge 10 will be less effective in affecting the magnetic layer of web 14. Therefore, depending on the strength of the externally applied magnetic field, end caps 22,24 and spool 26 may not need to be comprised of ferromagnetic material. However, it is recognized that comprising both end caps 22,24 and spool 26 of ferromagnetic material provides reliable shielding of the magnetic layer of the photosensitive material.

It is noted from the above discussion that if the orientation of the magnetic particles on web 14 are not oriented parallel to axis B, a magnetic field applied along axis A to film cartridge 10 may affect the magnetic layer of web 14. (For example, the web particles may be spherical in shape making the properties of the magnetic layer isotropic in the plane of the web.) Accordingly, as described above, it would be desirable to shield the "holes" in the magnetic field by comprising end caps 22,24 and/or spool 26 of ferromagnetic material.

A method is provided for shielding a web of photosensitive material having a magnetic layer with a pre-determined coercivity from an externally applied magnetic field. The steps include providing a film cartridge 10 comprising a material wherein the magnetic permeability of the film cartridge is greater than 1.0; the web to be protected being enclosed within the film cartridge. When the external magnetic field is provided through an EAS system, an article surveillance marker 110 is applied externally to the film cartridge; the marker being activatable by an activation magnetic field and deactivatable by a deactivation magnetic field. Together, the marker and film cartridge define a package. The marker is activated such that the marker is detectable by an interrogation electronic article surveillance magnetic field external of the film cartridge, and deactivated such that the marker is not detectable by the interrogation article surveillance magnetic field. During both activation and deactivation, the magnetic layer of the photosensitive web is shielded from the activation and deactivation magnetic fields, such that the magnetic layer is not adversely affected.

The present invention may also protect the magnetic layer of web 14 from magnetic fields other than electronic article surveillance magnetic fields. For example, a consumer may purchase a film cartridge 10 and bring it into a magnetic field such as from a permanent magnet or other incidental magnetic fields.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A cartridge for a photosensitive web material having a magnetic layer with a predetermined coercivity, the cartridge comprising a ferromagnetic material dispersed in a polymer, the composite material of the polymer and the ferromagnetic material having a magnetic permeability greater than 1.0, the magnetic layer of the photosensitive web being shielded from a magnetic field applied externally of the cartridge affecting the magnetic layer of the photosensitive web.

2. The cartridge according to claim 1 wherein the magnetic permeability of the ferromagnetic material is greater than 1 to about 50.

3. The cartridge according to claim 1 wherein the predetermined coercivity of the magnetic layer is from about 250 to about 1150 oersted.

4. The cartridge according to claim 3 wherein the predetermined coercivity of the magnetic layer is about 750 to about 950 oersted.

5. The cartridge according to claim 1 wherein a field ratio is defined by the ratio of the magnetic field applied externally of the cartridge to the coercivity, and the field ratio is less than or equal to the magnetic permeability.

6. The cartridge according to claim 5 wherein the field ratio is preferably less than or equal to about one-third of the magnetic permeability.

7. The cartridge according to claim 1 wherein the cartridge comprises a shell having two opposing ends, and an end cap attached to each end, at least one end cap consisting of a non-ferromagnetic material.

8. The cartridge according to claim 1 wherein the cartridge comprises a shell having two opposing ends, and an end cap attached to each end, at least one end cap comprising a ferromagnetic material dispersed in a polymer, the composite material having a magnetic permeability greater than 1.0.

9. A package comprising a film cartridge enclosing a web of photosensitive material having a magnetic layer with a predetermined coercivity, the package further comprising a marker positioned external to the film cartridge, the marker activatable by an activation magnetic field and deactivatable by a deactivation magnetic field, the magnetic fields applied externally of the film cartridge, the film cartridge comprising a dispersion of a polymer and a ferromagnetic material, the composite material having a magnetic permeability greater than 1.0, the film cartridge shielding the magnetic layer from the magnetic fields affecting the magnetic layer of the web.

10. The package according to claim 9 wherein the magnetic permeability of the ferromagnetic material is greater than 1 to about 50.

11. The package according to claim 9 wherein the predetermined coercivity of the magnetic layer is from about 250 to about 1150 oersted.

12. The package according to claim 11 wherein the predetermined coercivity of the magnetic layer is about 750 to about 950 oersted.

13. The package according to claim 9 wherein a field ratio is defined by the ratio of the magnetic field applied externally of the cartridge to the coercivity, and the field ratio is less than or equal to the magnetic permeability.

14. The package according to claim 13 wherein the field ratio is preferably less than or equal to about one-third of the magnetic permeability.

15. The package according to claim 9 wherein the film cartridge comprises a shell having two opposing ends, and an end cap attached to each end, at least one end cap consisting of a non-ferromagnetic material.

16. The package according to claim 9 wherein the film cartridge comprises a shell having two opposing ends, and an end cap attached to each end, at least one end cap comprising a ferromagnetic material dispersed in a polymer, the composite material having a magnetic permeability greater than 1.0.

17. The package according to claim 9 further comprising a spool onto which the web is wound, the spool comprising a non-ferromagnetic material.

18. The package according to claim 9 further comprising a spool onto which the web is wound, the spool comprising a ferromagnetic material dispersed in a polymer, the composite material having a magnetic permeability greater than 1.0.

19. An article of manufacture configured for cooperation with a camera, comprising:

a strip of photosensitive web material having a magnetic layer with a predetermined coercivity from about 250 to about 1150 oersted;

a spool onto which the strip of photosensitive web is wound, the spool comprised of a non-ferromagnetic material;

a shell comprising a ferromagnetic material dispersed in a polymer, the composite material of the shell having a magnetic permeability greater than 1.0, the shell having two opposing ends;

a plurality of end caps, an end cap attached to each of the ends of the shell, the shell, spool, and end caps defining a light-tight film cartridge for cooperation with a camera, the magnetic layer of the photosensitive web positioned within the light-tight film cartridge being shielded from a magnetic field applied externally of the cartridge affecting the magnetic layer of the photosensitive web.

20. The article of manufacture according to claim 19 wherein the end caps further comprise a ferromagnetic material dispersed in a polymer, the composite material having a magnetic permeability greater than 1.0.

21. A method of protecting a web of photosensitive material having a magnetic layer with a pre-determined coercivity, the method comprising the steps of:

providing a film cartridge comprising a material having a magnetic permeability greater than 1.0, the web of photosensitive material enclosed within the film cartridge;

shielding the magnetic layer of the photosensitive web from a magnetic field external of the film cartridge.

22. The method according to claim 21 wherein the step of providing a film cartridge is accomplished by providing a cartridge comprising a ferromagnetic material dispersed in a polymer.

23. A method of protecting a web of photosensitive material having a magnetic layer, the method comprising the steps of:

providing a film package including a film cartridge comprising a material having a magnetic permeability greater than 1.0, a web of photosensitive material having a magnetic layer with a pre-determined coercivity from about 250 to about 1150 oersted enclosed within the film cartridge, and a marker attached externally to the film cartridge, the marker activatable by an activation magnetic field and deactivatable by a deactivation magnetic field, the magnetic fields applied externally of the film cartridge;

activating the marker such that the marker is detectable by an interrogation article surveillance magnetic field external of the film cartridge; and deactivating the marker such that the marker is not detectable by the interrogation article surveillance magnetic field, the film cartridge shielding the magnetic layer of the photosensitive web from the activation and deactivation magnetic fields during said activating and deactivating.

24. The method according to claim 23 further comprising the step of interrogating the package by applying the interrogation article surveillance magnetic field to the package.

25. The method according to claim 23 wherein the step of providing a film cartridge is accomplished by providing a cartridge comprising the ferromagnetic material dispersed in a polymer, the composite material forming the cartridge having a magnetic permeability greater than 1.0.

26. The method according to claim 25 wherein the step of providing a film cartridge is accomplished by thermoforming a cartridge comprising ferromagnetic material dispersed in a polymer, the composite material forming the cartridge having a magnetic permeability greater than 1.0.

27. An article of manufacture configured for cooperation with a camera, comprising:

a strip of photosensitive web material having a magnetic layer with a predetermined coercivity from about 250 to about 1150 oersted;

a spool onto which the strip of photosensitive web is wound, the spool comprising a ferromagnetic material dispersed in a polymer, the composite material having a magnetic permeability greater than 1.0, a shell comprising a ferromagnetic material dispersed in a polymer, the composite material of the shell having a magnetic permeability greater than 1.0, the shell having two opposing ends;

a plurality of end caps, an end cap attached to each of the ends of the shell, the shell, spool, and end caps defining a light-tight film cartridge for cooperation with a camera, the magnetic layer of the photosensitive web positioned within the light-fight film cartridge being shielded from a magnetic field applied externally of the cartridge affecting the magnetic layer of the photosensitive web.

28. The article of manufacture according to claim 27 wherein the end caps comprise a ferromagnetic material dispersed in a polymer, the composite material having a magnetic permeability greater than 1.0.

29. The article of manufacture according to claim 27 wherein the end caps comprise a non-ferromagnetic material.

* * * * *